Dec. 7, 1926.

C. R. KENDALL

GEAR SHIFT BALL

Filed April 12, 1926

1,609,724

INVENTOR,
Charles R. Kendall
BY
ATTORNEY.

Patented Dec. 7, 1926.

1,609,724

UNITED STATES PATENT OFFICE.

CHARLES R. KENDALL, OF LOS ANGELES, CALIFORNIA.

GEAR-SHIFT BALL.

Application filed April 12, 1926. Serial No. 101,350.

My invention relates to automobile accessories and more particularly to a grip ball for use on gear shift levers.

The primary object of my invention is to provide a detachable ball for use as a handle on gear shift levers, which is highly ornamental and at the same time is serviceable and durable.

Other objects and advantages will appear hereinafter and while I show herewith and will describe a preferred form of construction, I desire it to be understood that I do not limit my invention to such preferred form but that various changes and adaptations may be made therein without departing from the spirit of my invention as hereinafter claimed.

Referring to the drawings which accompany this specification and form a part thereof, Fig. 1, is a side view of a transmission casing and gear shift lever showing one of my gear shift balls mounted thereon and illustrating its use.

Figure 1:
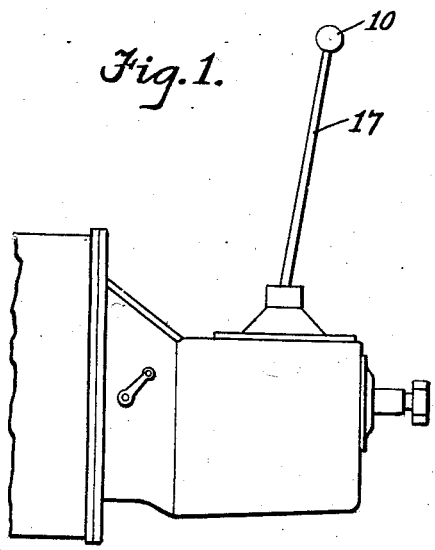
Figure 3:
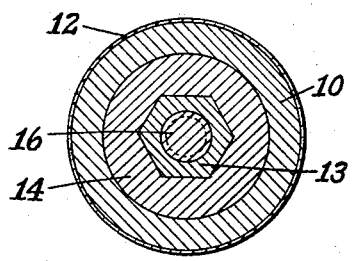
Fig. 3, is a sectional view of the ball shown in Fig. 2, taken through its center at right angles to the lever arm.
Figure 2:
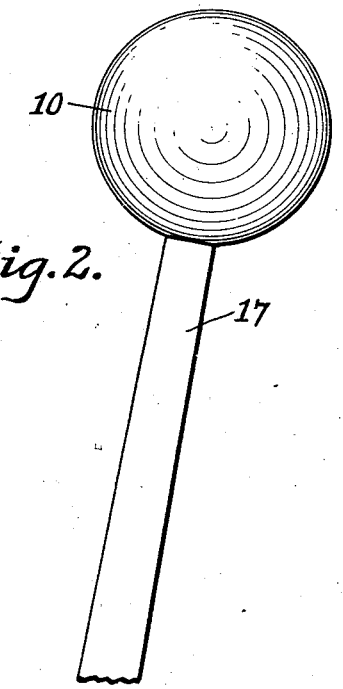
Fig. 2, is a fragmentary view of the lever shown in Fig. 1, showing the ball somewhat enlarged.
Figure 4:
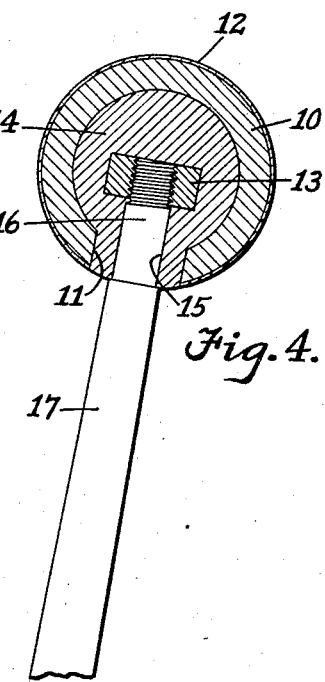
Fig. 4, is a sectional view of the ball, taken through its center in the plane of the lever arm.

Considered more in detail and in connection with the reference numerals, the ball is shown to consist of a shell or hollow sphere 10, preferably of porcelain or burnt clay, having an opening 11 in one side and having a glaze 12 on its outer surface in which coloring matter is incorporated so as to give it a mottled or streaked appearance resembling agate. A nut 13 is fixed in approximately the center of the ball, with the axis of its threaded aperture coinciding with the axis of opening 11 in the side of the shell 10, by solidified metal 14, preferably Babbitt metal, which when in a molten state is poured into shell 10 around nut 13 until it is completely filled, a core, corresponding in size to the end of the lever arm for which it is intended, being fixed in the nut and held in opening 11 of the shell during the process of pouring. The core is removed after the metal has solidified leaving a hole 15, which extends through the nut, whereby the ball as a whole is adapted to be screwed on the threaded end 16 of a lever arm 17 with a snug fit as is clearly shown in Fig. 4.

The ball thus formed may be used on other levers also but is especially suitable for gear shift levers and was particularly designed for use on them.

Having thus illustrated and described my invention, I claim:

A grip ball, for gear shift levers, comprising a hollow sphere having an opening in one side thereof and a variegated glaze on its outer surface; a metal filling within said hollow sphere, and a nut imbedded in said filling at the center of said sphere, said nut being so placed that its axis coincides with the axis of the opening in said sphere and with an aperture in said filling, thus adapting it to receive the threaded end of a gear shift lever.

CHARLES R. KENDALL.